Patented May 31, 1927.

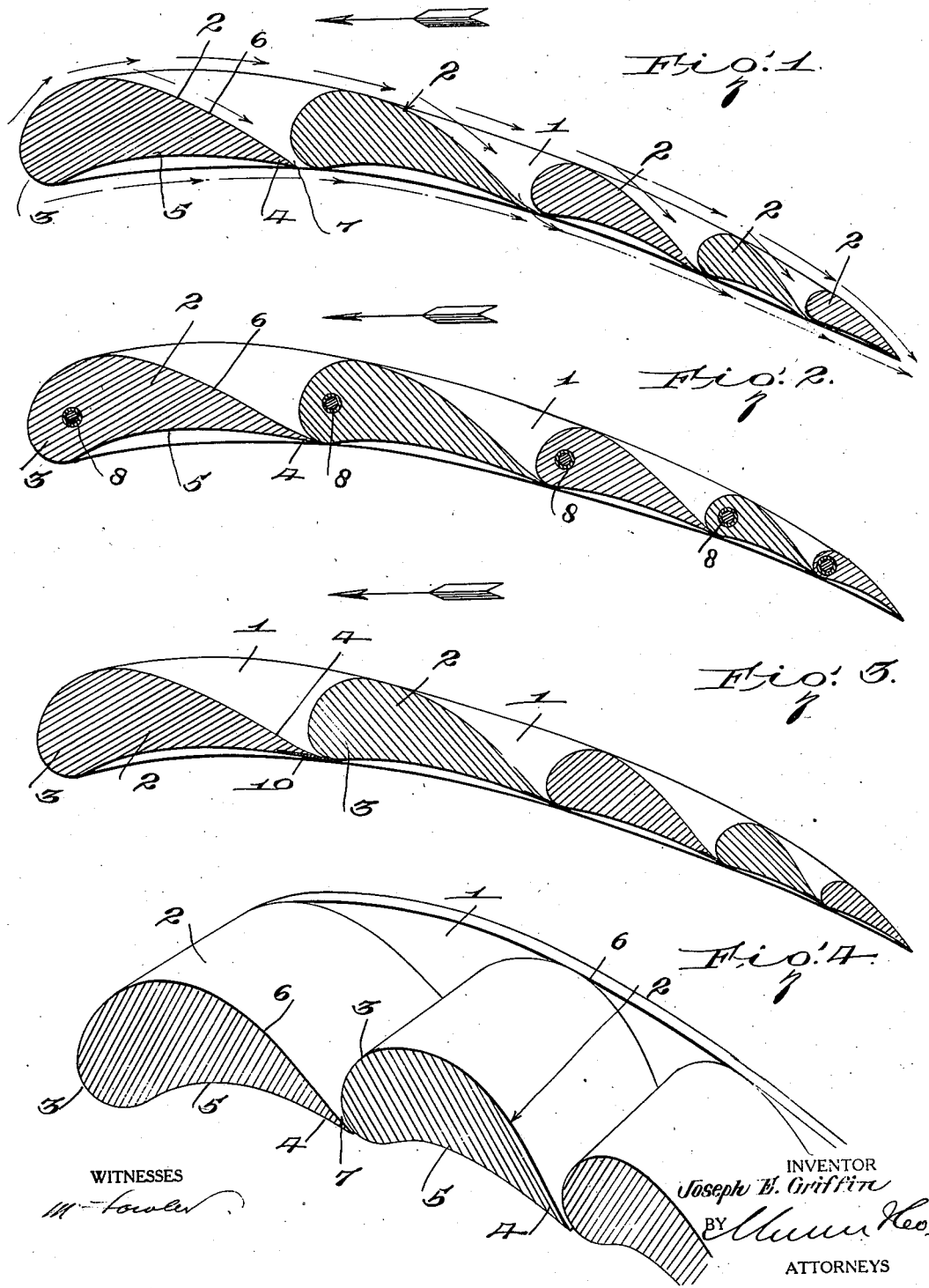

1,630,938

UNITED STATES PATENT OFFICE.

JOSEPH E. GRIFFIN, OF SAVANNAH, GEORGIA.

AIRPLANE WING CONSTRUCTION.

Application filed November 19, 1925. Serial No. 70,142.

This invention relates to an airplane wing construction.

The object of the invention is to provide an airplane wing construction whereby there is created a rarefaction or approximate vacuum on the upper surface of the wing and a pressure on the lower surface of the wing by virtue of the actual withdrawal of air from above the wing and the discharge of the same beneath the wing with the result that any undesirable eddy currents that may be present are not only prevented from exerting an undesirable reaction on the top of the wing but are carried to below the wing and aid in the support of the same. The advantages of this action are that it permits of flying, taking-off, climbing or alighting at slower speeds and with a lesser angle of incidence than is possible with machines and wing constructions heretofore proposed. One of the important points to be noted is that the wing construction embodying the present invention creates the vacuum of the upper surface without the necessity of the upper surface being greatly masked by the leading edge of the wing.

Accordingly the present invention provides a wing construction which is made up of a number of sections or elements extending transversely of the wing and arranged in such manner as to give the assembly of the sections the general contour of the conventional wing. Each section is in the form of a miniature wing having a leading edge and a trailing edge, a concaved lower surface and a convexed upper surface. Preferably the curved upper and lower surfaces of the wings have the form of a cycloid. In the assembly of the sections the trailing edge of each section is under though slightly spaced from the leading edge of the next rearward section whereby the wing structure is in effect slotted in such a manner that the air flowing past the undersurface of the wing will entrain the air above the wing through the slots and cause the air above the wing to be rarefied, thereby producing a suction or upward lift on the top of the wing which augments the pressure exerted by the air beneath the wing. The entraining of the air from above the wing by the air current below the wing is enhanced by the concaved formation of the undersurface of the wing which effects a compression of the air in such manner as to increase its velocity across the slot or space between the wing sections. In order to adapt the wing structure for high speeds provision may be made for closing the slots or spaces between the sections of the wings and this may be accomplished either by pivotally mounting the wing sections and controlling them in any approved fashion or by rigidly mounting the sections and forming their trailing edges of flexible portions designed to be held against the leading edges of the wings by means of the pressure set up below the wings.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a sectional view of a wing construction embodying the present invention, Figure 2 is a similar view showing a slightly different form of the invention from that illustrated in Figure 1, Figure 3 shows another form of the invention, and Figure 4 is a fragmentary perspective view of the device shown in Figure 1.

Referring to the drawings it will be seen that the airplane wing construction constituting the present invention comprises in all embodiments of the invention, a suitable framing, one end bar of which is designated at 1. The framing may have any suitable mounting on or in the airplane construction. The body of the wing which is carried by the frame 1 comprises a plurality of sections, designated generally at 2.

In all embodiments of the invention each section 2 is in the form of a miniature wing and has a rounded leading edge 3 of relatively greater thickness. Rearwardly from its leading edge 3 each wing section 2 gradually reduces or tapers to a thin trailing edge 4. The undersurface of each section 2 is concaved, as indicated at 5, whereas the upper surface is convexed, as indicated at 6. The curved surfaces 5 and 6 preferably take the form of a cycloid.

In the assembly the sections are arranged so that the trailing edge of one section underlies the leading edge of the next rearward section.

In the form of the invention shown in Figs. 1 and 4 the trailing edges not only underlie but are fixed and permanently spaced from the leading edges to define passages or slots 7.

In the form of the invention shown in Figure 2 each wing section is mounted for pivotal movement about an axis 8 which extends through the wing section adjacent its leading edge and which is mounted on the framing of the wing. This permits the wing sections to be adjusted by suitable control means (not shown) to bring the trailing edges 4 into engagement with the leading edges 3 or into spaced underlying relation with respect thereto. In the last mentioned relation the arrangement is substantially like that shown in Figure 1. It is to be understood that while no control means are shown for the pivoted wing sections of Figure 2 that various types of controls for similar elements as well known in the art and usually consist of a system of interconnected levers actuated from a suitable controlling element. In the present case the levers may be used to close the wing; that is, to bring the trailing and leading edges into engagement and the wing sections may be held in open position normally by means of the springs or other yieldable elements.

In the form of the invention shown in Figure 3 the trailing edges of the wing sections occupy substantially the same relation to the leading edges as in Figures 1 and 4 but in addition to the rigid wing section structure elastic or yieldable portions 10 may be embodied in the trailing edges, such portions 10 being constituted by means of resilient strips or flaps which by virtue of their inherent elasticity and resiliency are biased normally to occupy a spaced underlying relation to the leading edges of the various wing sections. However, under the influence of the high pressures which are set up under the wings when flying at high speeds the elastic portions 10 are forced up against the undersurfaces of the leading edges to provide a substantially closed wing structure.

In all embodiments of the invention the wing constructions present at normal flying speeds a substantially slotted structure wherein the trailing edges of the wing sections underlie the leading edges define the slots and this arrangement has the effect of causing the air passing rapidly under the wing to entrain the air in the slots 7 and pull the same out of the slots and from above the wing to below the wing, thereby creating a rarefaction or approximate vacuum above the wing and increasing the pressure below the wing. The action is similar to that of an aspirator or injector in that a stream of fluid or air moving at high velocity picks up or entrains another body of air. This entraining action is enhanced by the contour of the wing sections. The concaved undersurfaces of the wings causes the air to be compressed and the pressure of the air to be raised below the wings and this increased pressure causes the air to flow past the slots or passages 7 with increased velocity whereby to increase the entraining action of such air on the air in the passages and on the air above the wing. The convexed upper surface of the wing sections which cause the face of the wing sections to slope downwardly toward wing sections to slope downwardly toward their trailing edges on their tops facilitates the entraining of the air. By drawing the air from above the wings to below the wing in this manner the lifting power of the wing is increased since there is a suction produced above the wing and a greater pressure produced below the same. Moreover, if any eddy currents are set up they cannot react on the top surface of the wing because they are drawn down through the slots 7 and are utilized below the wing to aid in the lifting thereof. The advantages of this arrangement and action are to permit flying, taking-off, climbing, or landing at slower speeds and with a lesser angle of incidence than heretofore possible. The lifting power of the wing is increased by the vacuum created above the same without the necessity of greatly masking the leading edges of the wing.

It is to be understood that not only is each wing section formed with curved upper and lower surfaces after the manner of a cycloid but the general assembly or wing as a whole has upper and lower cycloidal surfaces.

I claim:—

1. An airplane wing construction made up of a plurality of sections, each section having a relatively thick and blunt leading edge and having its upper surface bearing downwardly and rearwardly to a relatively thin trailing edge, the thin trailing edge of each wing section underlying the leading edge of the section immediately rearwardly thereof, the tapering upper surfaces and the leading edges of adjacent wings co-acting to define air passages extending through the wing construction, said air passages being relatively wide and of relatively great area at the top of the wing and gradually narrowing to a thin slit-like opening at the bottom of the wing whereby when the wing travels through the air, air will be withdrawn from above the wing and discharged beneath the same to create a rarefaction above the upper surface of the wing and a pressure on the lower surface thereof and to eliminate eddy currents.

2. An airplane wing construction in accordance with claim 1 and wherein the trailing edges of all of the sections except the last rearward sections are elastic so as to be normally spaced from the leading edges but engageable with said leading edges when the pressure thereon exceeds a predetermined degree.

3. An airplane wing construction in accordance with claim 1 and wherein the undersurfaces of each section are concaved.

4. An airplane wing construction in accordance with claim 1 and wherein each wing section curves downwardly and rearwardly with respect to the next forward section.

JOSEPH E. GRIFFIN.